July 1, 1952 T. F. McCARTHY 2,602,119
PAY STATION TIME SIGNAL
Filed Oct. 15, 1947
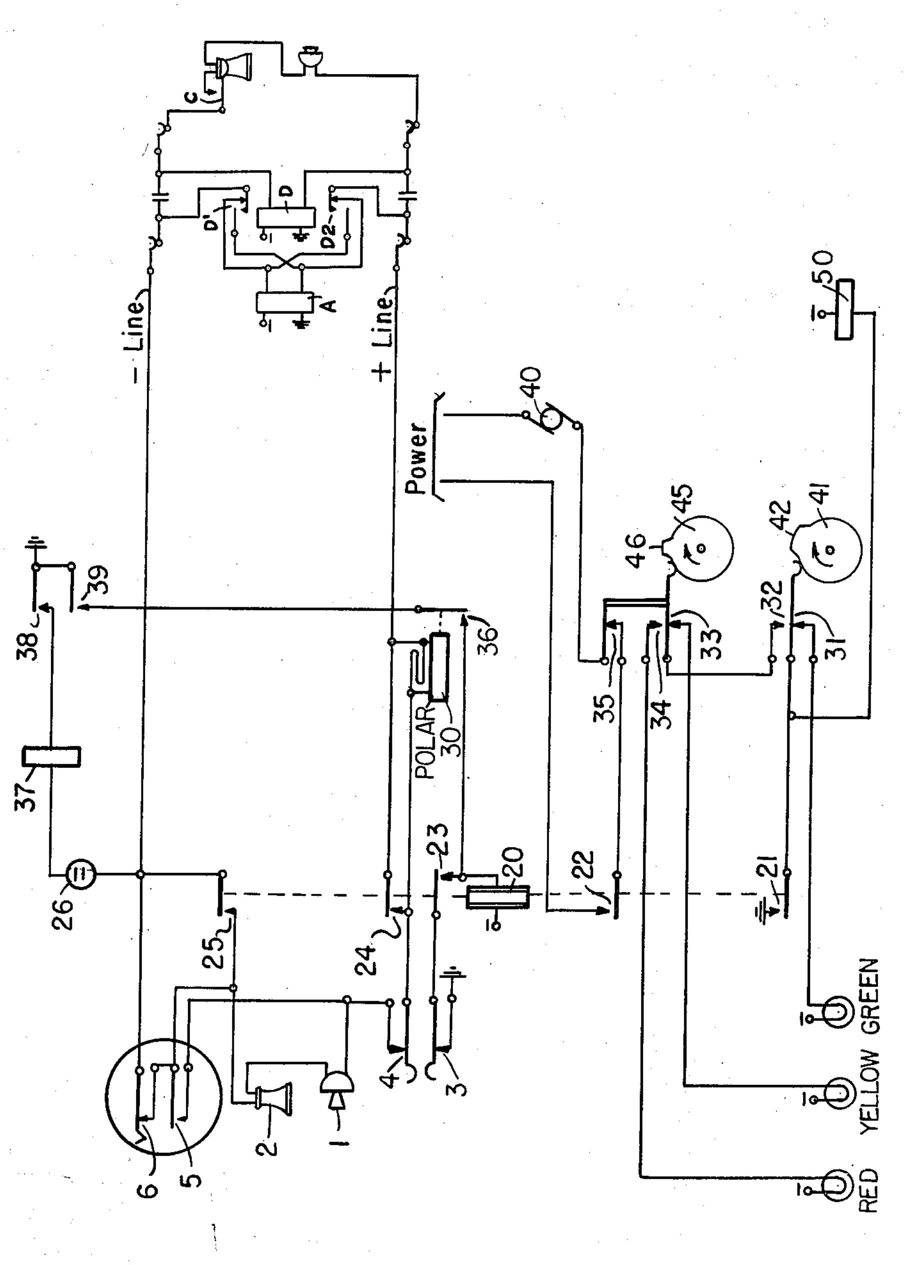
INVENTOR.
THOMAS F. Mc CARTHY
BY
[signature]
ATTORNEY Patented July 1, 1952 2,602,119

UNITED STATES PATENT OFFICE 2,602,119

PAY STATION TIME SIGNAL

Thomas F. McCarthy, Washington, D. C., assignor to Automatic Electric Laboratories, Inc., Chicago, Ill., a corporation of Delaware Application October 15, 1947, Serial No. 779,961

5 Claims. (Cl. 179—7.1)

The present invention relates to telephone systems in which both measured and non-measured service is provided and more particularly to paystation lines in automatic systems.

An object of the invention is the provision of a plurality of visual signals individual to a paystation telephone to visually indicate three time periods during an established time talking connection.

It is customary to make a minimum charge for and grant a maximum time period in connection with telephone service which is rendered on a basis of payment for the elapsed time between commencement and completion of the conversational period.

The calling subscriber is enabled by this invention to take full advantage of the maximum time allowed by the customary practice and at the same time to regulate his conversation in order to remain within the minimum charge period should he desire to do so.

The embodiment described hereunder of this invention, provides a lamp to indicate to the calling subscriber that the connection is completed to the called subscriber and that conversation may commence, usually a green light. A second lamp, showing a yellow light, informs the calling subscriber that the end of the minimum charge period is approaching. A third lamp, showing a red light indicates the end of the minimum charge period and calls the subscriber's attention to the extra charge which will be made for each minute or fraction of a minute during which the line is held after the end of the minimum charge period.

According to another object of this invention, a timing means is provided at the pay-station which is set in motion in response to the completion of the talking connection over circuits where a charge is made in relation to the length of conversation. The timing means controls the circuits to light the lamps in sequence to indicate the time periods mentioned above.

An application of the invention will be understood by reference to the specification taken in connection with the accompanying drawing, consisting of one sheet, and showing the circuits and apparatus associated with a paystation line embodying the invention.

The paystation line apparatus comprises the well known substation circuit having the usual transmitter and receiver connected in series, a calling device, and the usual switchhook spring assembly. The usual substation ringer has been omitted. The coin control magnet 37 is associated with one of the line conductors and is connected in series with a neon lamp 26 and one of the coin controlled springs 38. A polarized relay 30 is associated with the other line conductor. Also enclosed in the coin box of this paystation circuit there is provided a small electric motor 40 which is operated by the usual commercial source of current under control of a relay 20 and cam controlled springs 35. A clutch (not shown) is controlled by clutch magnet 50 to operatively connect the motor shaft with the shaft on which the cams 41 and 45 are mounted. The enlarged segments 42 and 46 are provided for operating cam springs 31 and 33 a predetermined time after being clutched to the shaft of motor 40. When the clutch magnet 50 releases the clutch is disconnected to restore cams 41 and 45 and cam springs 31 and 33 to normal as shown in the drawing. Green, yellow and red lights are mounted in the coin box for visually indicating to the calling subscriber the initiation of a predetermined time period, the approximate end of the predetermined time period, and expiration of such predetermined period and the overlapping into a succeeding time period.

The outgoing circuit from the paystation is indicated as positive (+) LINE and negative (—) LINE. The circuit is shown with the receiver off the hook and therefore the contacts 3 and 4 of the hookswitch spring assembly are in operated position. A circuit can be traced from (+) line through the winding of the polarized relay 30, contact 4 of the hookswitch spring assembly, transmitter 1, receiver 2, contact 6 in the impulse dial to (—) line. Current from the central exchange is flowing through the winding of the polarized relay 30, but this relay does not operate at this time. The calling subscriber may dial a number, such as the information service and converse with an information operator without depositing a coin. Certain other services are also available without special charge. The paystation is connected to the called party's line by means of well-known connectors and selectors in the central office. Only the wipers and the wiper bank contacts of these selectors and connectors are shown on the drawing. The condensers shown are the well-known talking condensers. Seizing of the connector switch causes the above-mentioned current to flow through the polarized relay 30 from the A relay in the called party's connector. When the called party answers his phone, he closes his switchhook C and thereby energizes his back-bridge relay D, which in turn reverses the current, by means of the make-before-break contacts D1 and D2, over the paystation line to the relay 30.

However, should a calling subscriber desire a connection with a toll line or other service for which a charge is to be made on the basis of length of conversation, a coin is deposited causing a relay (not shown) or a trip lever (not shown) in the coin chute to operate and close contacts 38 and 39 to prepare a part of the circuit to the winding of relay 20 and to the coin control magnet 37. Should the called line be engaged the calling party may hang up his receiver and the coin will be returned. Should the called line answer, a reversal of current back over the circuit from the exchange will cause polarized relay 30 to operate, closing its contact 36. Relay 20 now operates from ground, coin contact 39, contact 36, winding of relay 20, to battery closing contacts 21, 22, 23, 24 and 25.

The operation of relay 30, as mentioned above, corresponds to the commencement of the conversational period, therefore the timing apparatus is set in motion and the timing lamp signals operated in accordance with the following explanation.

Relay 20, at its contact 22 closed the power circuit to the constant speed motor 40, and at its contact 21 closed a circuit to the clutch magnet 50. Magnet 50 operates a clutch (not shown) causing the shaft of the cams 41 and 45 to engage, through a reduction gear (not shown) the shaft of motor 40. This gear is so arranged that the two cams 41 and 45 operate at the same speed, whereby the enlarged segment 42 on cam 41 will operate the lower spring set 31—32 at the end of a predetermined time period (say two and one half minutes) and the enlarged segment 46 on cam 45 will operate the upper spring set 33—35 at the end a further thirty second period.

It should be noted here that, at the moment relay 20 operated and closed contacts 22 and 21 to start the motor and operate the clutch magnet 50, contact 21 also furnished ground through contact 31 of the cam spring assembly, to light the green light. This green light informs the calling subscriber that conversation may commence and also indicates the beginning of the timing period.

It should be noted here that through its contact 23, relay 20 is locked to ground via contact 3 in the hookswitch assembly and, through contact 24 on relay 20, relay 30 is shunted from the talking circuit thus improving transmission.

As relay 20 is locked to a contact in the hookswitch assembly the timer cannot be reset, in the event that relay 30 should respond to the flashing of the receiver hook by the calling party and further, relay 20 is slow to release and should the receiver hook be held down and the hookswitch contact 3 remain open a sufficient length of time for relay 20 to release, the automatic switches in the exchange would also release, making it necessary for the calling subscriber to deposit a second coin and initiate a second call. A further precaution against making a second call without depositing a coin, is provided by shunting the calling device impulse springs at contact 25 on relay 20. The neon tube 26 in series with relay 37 is the well known arrangement for collecting the coins, by employing a booster battery current over the negative line.

At the commencement of the timing period, the green light is illuminated, as explained above, and the action of the clutch magnet 50, operates a clutch to cause the two cams 41 and 45 to be turned slowly by the motor shaft, through a reduction gear (not shown). The enlarged segment 42 on cam 41 is set, say in two and one-half minutes, to open contact 31 and close contact 32. The green light is extinguished and, the yellow light is illuminated over the following circuit; ground, contact 21 on relay 20, make contact 32, break contact 33, yellow lamp, to battery. Cams 41 and 45 continue to revolve, cam 41 maintaining the circuit for the yellow lamp. The yellow lamp is a warning to the subscriber that the minimum time period has about expired. In a pre-determined period of time after the yellow lamp is illuminated, say thirty seconds, the enlarged segment 46 on cam 45 opens contact 33 and closes contact 34, thus the circuit to the yellow lamp is opened at contact 33 and the red lamp illuminated over the following circuit; ground, contact 21 on relay 20, contact 32, contact 34, red lamp, to battery. This red lamp is the second and last warning, the calling party is thus aware that the minimum charge period has been consumed and any further holding of the line will be an additional fee on the basis of a charge for each minute or fraction thereof. It will be noted also, that at the instant of closing of contact 34 to illuminate the red light, contact 35 was operated to open the circuit to the motor 40, which stops immediately. Here it should be noted that the two cams 41 and 45 stop rotating at the same moment when the shaft of the motor 40 stops, thus leaving the springs 32, 34 and 35 closed as described above and the red signal lamp continues to glow over the following circuit; ground, contact 21 on relay 20, contact 32, contact 34, red lamp, to battery. The red lamp continues to remind the calling party that his continued holding of the line is on an additional fee basis.

When the conversation is completed and the calling party has restored his receiver, the slow-to-release relay 20, will restore shortly afterwards. The circuit to clutch magnet 50 is opened at contact 21, the release of the armature of magnet 50, releases the cams 41 and 45 and these return to their normal positions as explained hereunder.

When the cams 41 and 45 are rotated in the direction of the arrows, tension is being increased on a spiral spring (not shown) on the cam shaft in such a manner that this spring tension is sufficient to return the cams to their normal position, as shown in the drawing, as soon as the clutch magnet 50 is de-energized to dis-engage the clutch.

As mentioned above, the contact 25 on relay 20, shunts out the impulse springs of the dial at the instant the current is reversed back over the calling line in response to called party removing his receiver, this is to guard against resetting the timer by hanging up the receiver for an instant to release the switches in the exchange and then dialing a second call before relay 20 restores. The slow release feature of relay 20 may be regulated to maintain its armature for a slightly longer period than required for the switch train to release, thus allowing the central office equipment to restore to normal before the armature of relay 30 restores and returns to its normal position whereby the circuit is again in condition to receive a second call.

What is claimed is:

1. In a telephone system, a paystation telephone, a first lamp at said telephone for indicating completion of a talking circuit to a called subscribers line, a second lamp at said telephone for warning the paystation subscriber that a minimum charge period is about to elapse, a third lamp at said telephone for indicating that the minimum charge period has elapsed and that the paystation subscriber will be charged an additional fee, means for completing a talking connection between said paystation telephone and a called line, timing means at said paystation telephone operated in response to the answering of the called party for timing the length of conversation, a circuit at said telephone controlled by said timing means for operating said first lamp instantaneously when called party answers, a second circuit at said telephone controlled by said timing means for operating said second lamp after a predetermined time, and another circuit at said telephone controlled by said timing means for operating said third lamp when said talking connection is maintained beyond said predetermined time.

2. In a telephone system, a paystation line having a paystation telephone instrument, a plurality of signal lamps at said instrument, a timing means at said instrument including a constant speed driving member which is set in motion by a particular circuit condition, a second station in said system, means in said system for completing a call from said paystation to said second station, said particular circuit condition effective instantaneously when said second station answers a call from said paystation to start said timing means, circuit means controlled by said timing means to cause said lamps to be illuminated in sequence to signal said paystation, the first instantaneously when said called station answers, the second when a predetermined period of time has elapsed following the answer by the said called station, the third to signal when said second predetermined period of time has elapsed, following said first period of time, to advise the caller, at said paystation that an additional fee will be charged for any continued holding of the said completed call.

3. In a telephone system, a paystation telephone, colored signals located at said telephone, a constant speed rotatable member at said telephone with a first shaft, a second shaft mounting a first and second cam member, means for completing a talking connection between said paystation and a called line, a circuit to illuminate the first of said colored signals, means individual to said paystation operated in response to the answering of the called party for closing said circuit to instantaneously illuminate the first of said colored signals to indicate the completion of the said talking connection and the beginning of the conversational period, circuit means controlled by said second means to rotate said member and said first shaft, additional means controlled by said second means for bringing said second shaft in rotatable relation with said first shaft whereby said second shaft and said cams are rotated at a constant speed, a circuit for the second of said colored signals, said first cam after a predetermined period of time opening said first signal circuit to cause the first signal to be returned to normal and closing said second signal circuit to cause the second colored signal to be illuminated to warn the calling subscriber of the close approach to the end of the minimum charge period, a circuit for the third of said colored signals, said second cam after a second predetermined time period which follows the said first predetermined time period opening said second signal circuit to cause said second signal to be returned to normal and closing said third signal circuit to cause said third colored signal to be illuminated to indicate the beginning of an additional fee for any further holding of the said talking connection.

4. An automatic telephone time warning device comprising in combination, a telephone, a plurality of signal lights and a timing means all at said telephone, relay means at said telephone for actuating one of said lights and starting said timing means at the instant of completion of a conversation circuit, a pair of cams rotatable by said timing device, a switch operable by the rotation of one of said cams, an electric circuit at said telephone connecting said switch to a second of said signal lights, another switch operable by the rotation of the other of said cams, and an electric circuit at said telephone connecting said first mentioned switch to a third of said signal lights by the operation of said other switch.

5. An automatic telephone conversation timing device for operation in conjunction with a telephone comprising three electric signal lights at said telephone, an electric timing motor at said telephone, a relay control circuit at said telephone for said timing motor and one of said signal lights, said relay control closing the circuit of said signal light and said timing motor at the instant of completion of a conversation circuit through said telephone, two cams rotatably connected to said timing motor, an electric cam switch operated by each of said cams, said cam switches being operable by rotation of said cams, and electrical circuits connecting each of said cam switches to a signal light whereby said lights are actuated at predetermined intervals by the rotation of said cams.

THOMAS F. McCARTHY.

REFERENCES CITED

The following references are of record in the file of this patent:

UNITED STATES PATENTS

| Number | Name | Date |
|---|---|---|
| 1,443,451 | Anderson | Jan. 30, 1923 |
| 1,664,873 | Boynton | Apr. 3, 1928 |
| 1,726,983 | Friendly | Sept. 3, 1929 |
| 1,993,793 | Mead | Mar. 12, 1935 |
| 2,232,181 | McClew | Feb. 18, 1941 |
| 2,400,085 | Gent | May 14, 1946 |

FOREIGN PATENTS

| Number | Country | Date |
|---|---|---|
| 228,347 | Switzerland | Nov. 16, 1943 |